Jan. 24, 1956  J. N. ANDERSON  2,732,041

BRAKE

Filed June 8, 1950

JOHN NORMAN ANDERSON INVENTOR

BY  *J. L. Sharon*  ATTORNEY

# United States Patent Office 2,732,041
Patented Jan. 24, 1956

2,732,041

BRAKE

John Norman Anderson, Hoboken, N. J., assignor to Otis Elevator Company, New York, N. Y., a corporation of New Jersey Application June 8, 1950, Serial No. 166,925

2 Claims. (Cl. 188—171)

The invention relates to brakes of a type in which a brake shoe carried by an operating arm is applied to a brake drum. More particularly, the invention relates to brakes for elevator hoisting machines in which a pair of brake shoes on pivoted arms are arranged to be applied to opposite sides of a brake drum.

One feature of the invention is the provision of a brake wherein unequal wear of the brake shoe lining is minimized.

Another feature of the invention is the provision of a brake in which lost motion between the brake shoe and operating arm is eliminated.

Still another feature of the invention is to provide a brake of the above character which is of simple construction and economical to manufacture as well as reliable and quiet in operation.

Other features and advantages will become apparent from the specification and claims, taken in connection with the accompanying drawing wherein two embodiments of the invention are illustrated.

Figure 1:
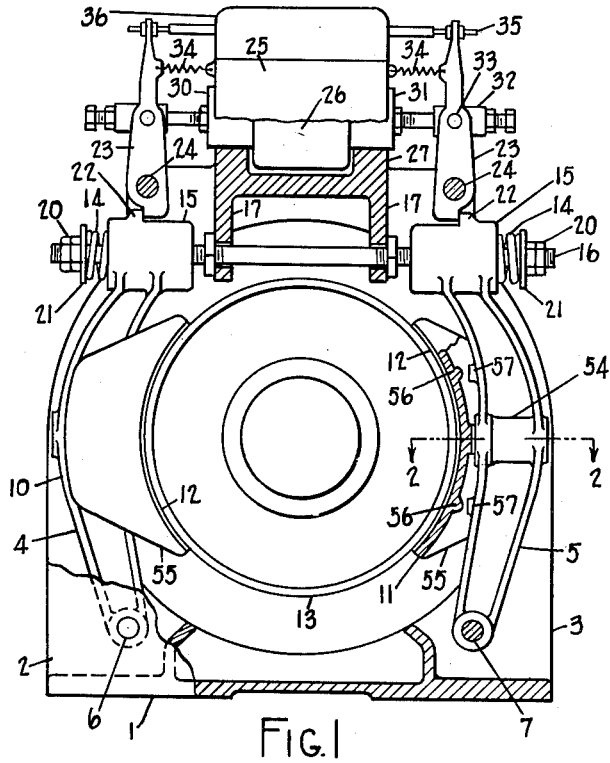
Figure 1 is a view in elevation of an elevator hoisting machine brake embodying the invention, parts being broken away.

Referring to Figure 1, the brake frame is formed with a base 1 and side members 2 and 3 extending upwardly from the base in inverted U construction. Brake operating arms 4 and 5 are pivotally mounted on pins 6 and 7 supported by the side members 2 and 3. These arms carry brake shoes 10 and 11. Each shoe has a lining 12 for engaging brake drum 13. Compression springs 14 act on the brake arms to apply the brake shoes to the brake drum. These springs are positioned in cup shaped housings 15 formed on the upper portions of the brake operating arms. The springs are arranged on a rod 16 supported on cross members 17 of the brake frame and extending through apertures in the housings 15. The springs are held in compression against the bottoms of their housings by means of nuts 20 on the threaded ends of the rod and bearing against spring seat washers 21.

Each housing 15 has formed on its upper surface a lug 22. These lugs are adapted to be engaged by lugs formed on operating levers 23 pivotally mounted on pins 24 supported by the side members 2 and 3. Levers 23 are adapted to be operated by an electromagnet 25 to move the arms 4 and 5 against the force of springs 14 to release the brake shoes 10 and 11 from the brake drum 13. The coil 26 of the electromagnet is mounted on a frame 27 supported by the side members 2 and 3. The electromagnet is provided with two oppositely movable brake cores 30 and 31 having a stop (not shown) for limiting their inward movement. These cores are secured to operating levers 23 by means of eye bolts 32 and pins 33, the bolts being adjustable in the cores to adjust the clearance of the brake shoes when released. The levers 23 are biased into position to engage lugs 22 by springs 34. On the upper ends of the levers 23 are operating rods 35 for the brake interlock switch (not shown) arranged in compartment 36.

Figure 2:
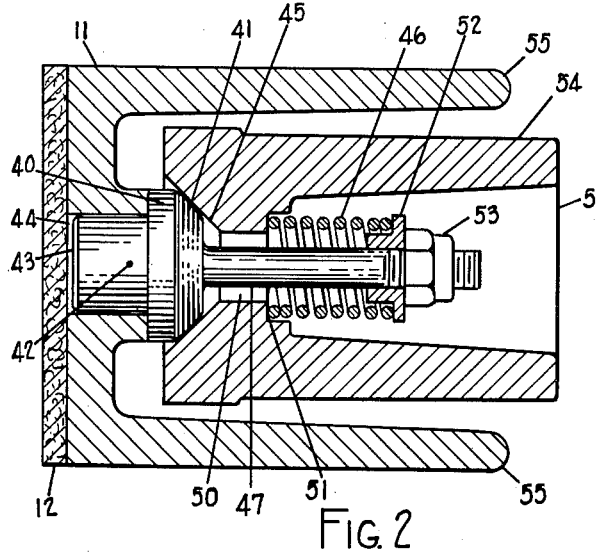
Figure 2 is an enlarged detail view in section, taken along the line 2—2 of Figure 1.

The brake shoes are mounted in the same way on the brake arms, this being illustrated in detail for brake shoe 11 in Figure 2. The shoe is mounted on the brake arm by a ball and socket joint. The ball 40 is formed as of a segment 41 of a sphere with the sphere's center 42 at a point such that the resultant of the friction forces between the shoe and the drum passes through this point. This ball portion of the joint is illustrated as an insert and is of steel formed with a shank 43 extending into aperture 44 formed in the shoe. The socket 45 is in the form of a hollow truncated cone. The ball is biased into the socket by a spring 46. This spring is arranged on a stem 47 formed on the ball portion of the joint and extending through an enlarged aperture 50 in the brake arm. The spring extends between a shoulder 51 formed on the brake arm and a spring seat 52 arranged on the stem. A nut 53 is provided on the threaded end of the stem abutting the seat 52 to adjust the compression of the spring and hold the seat in adjusted position. A housing 54 is formed on the brake operating arm for spring 46.

Each brake shoe is formed so that its center of gravity coincides with the center 42 of the ball portion of the joint. This is effected by forming ribs 55 on each brake shoe. This balances the shoe about center 42 and thus eliminates any tendency for the shoe to swing about the joint. Also ribs 55 cooperate with housing 54 to prevent damage to stem 47 in handling when the arm and shoe are not mounted on the brake frame. In this they are assisted by abutments 56 and 57 formed on the shoe and brake operating arm.

While electromagnet 25 is deenergized, compression springs 14 act through brake arms 4 and 5 to apply the brake shoes to the drum 13. Because of the ball and socket joint, the pressure exerted on the drum is equalized all along the surface of each brake shoe. Upon energization of the electromagnet, the cores 30 and 31 act through levers 23 to overcome the force of springs 14, moving the brake arms into position to release the shoes from the drum. Due to the fact that the shoes are balanced, there is no tendency for them to fall back on the drum when released. Upon deenergization of the electromagnet, the springs 14 apply the brake and the shoes automatically seat themselves evenly on the drum. This is true even though the axis of the brake drum and the axes of pins 6 and 7 are not exactly parallel. Thus equal wear of the brake linings is assured. Also the fact that there is no lost motion between the brake shoes and brake arms facilitates adjustment of the brake and minimizes the possibility of non-uniform braking operations.

Figure 3:
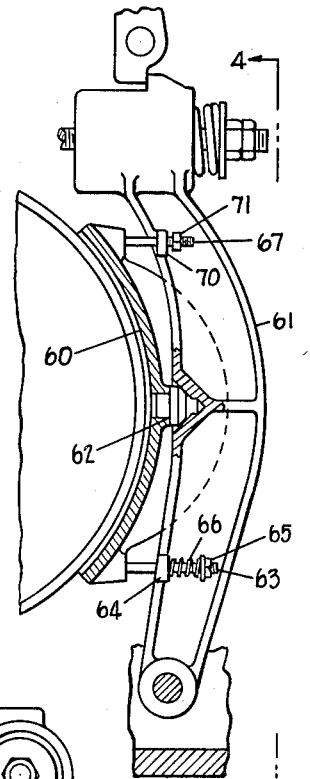
Figure 3 is a fragmental view in elevation of a modified construction of brake, parts being broken away.
Figure 4:
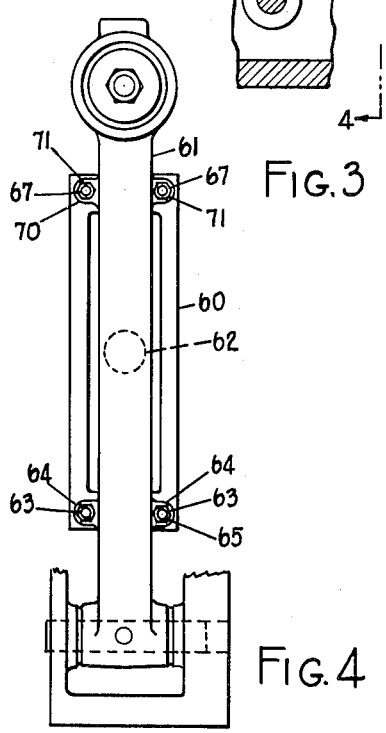
Figure 4 is a view taken along the line 4—4 of Figure 3.

Other arrangements for retaining the brake shoe in the desired position with respect to the brake arm may be utilized as shown for example in Figures 3 and 4. There the brake shoe 60 is mounted on the brake arm 61 by a ball and socket joint 62. The ball is formed as an insert with its center coinciding with the resultant of forces between the shoe and the drum as before. Instead of biasing the ball into the socket in the manner shown in Figure 2, two studs 63 spaced equidistant from the sides of the brake operating arm are secured to the brake shoe near its lower end and pass through clearance holes in lugs 64 formed on the arm. Interposed between the nuts 65 on the studs and the lugs 64 are compression springs 66. Similarly spaced studs 67 are secured to the brake shoe near its upper end and pass through clearance holes on lugs 70 formed on the brake operating arm. On the ends of studs 67 are nuts 71 adjusted to provide a certain clearance (shown exaggerated) with respect to lugs 70 when the shoes are applied. Upon release of the brake, springs 66 maintain the upper tip of the brake shoe in contact with the drum and the ball seated in the socket until the clearance between nuts 71 and lugs 70 is taken up. When this takes place the brake shoe and brake arm move as a unit to release the shoe from the drum. Nuts 71 are adjusted so that with the brake released the clearance between the upper tip of the shoe and the drum is the same as between the lower tip and the drum. Also nuts 71 are utilized to adjust the brake shoe for edge clearance as well as tip clearance. Also these nuts may be utilized to properly adjust the shoe when the axes of the brake drum and brake arm pins are out of parallel.

While the balls of the ball and socket joints are shown as inserts, they may be made integral with the shoes when low brake pressures warrant. In that case it would be preferred with the construction shown in Figure 2 to form the stem 47 from a steel stud.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Brake mechanism comprising; a brake drum; a brake shoe for engaging said drum; a pivoted operating arm for said shoe; operating mechanism for said arm; and means mounting said shoe on said arm, said mounting means including a socket on said arm, a ball on said shoe and extending into said socket, the center of the thus formed ball and socket joint coinciding with the resultant of the friction forces between said shoe and said drum, abutment means secured to said shoe at the upper end thereof for limiting movement of said shoe about said joint with respect to said arm when said shoe is released, said abutment means providing a slight operating clearance with respect to said operating arm when the shoe is applied, and spring actuated means at the lower end of the said shoe for biasing said ball into said socket and for maintaining the upper end of said shoe in engagement with said drum when said shoe is being released until said operating clearance is taken up.

2. Brake mechanism comprising; a brake drum; a brake shoe for engaging said drum; a pivoted operating arm for said shoe; operating mechanism for said arm; and means mounting said shoe on said arm, said mounting means including a hollow cone formed on said arm, a spherical segment carried by said shoe and extending into said hollow cone to form a ball and socket joint, said segment having its center coinciding with the resultant of the friction forces between said shoe and said drum, a pair of studs secured to said shoe at each end thereof and extending through said operating arm near the sides thereof, said studs being provided with adjustable abutment nuts on their outer ends with those for the studs at the upper end of the shoe having a slight clearance with respect to said operating arm when the shoe is applied, and a pair of compression springs, one for each stud at the lower end of said shoe, arranged on their respective studs between the nuts and said arm for biasing said segment into said cone and acting to move said shoe about said joint to maintain the upper end thereof in engagement with said drum when said shoe is being released until said clearance is taken up.

References Cited in the file of this patent

UNITED STATES PATENTS

| | | |
|---|---|---|
| 1,102,523 | Lindquist et al. | July 7, 1914 |
| 1,455,895 | Thurston | May 22, 1923 |
| 1,772,867 | Jones | Aug. 12, 1930 |
| 2,128,387 | Wehr | Aug. 30, 1938 |